United States Patent
Sethi et al.

(10) Patent No.: US 12,547,445 B2
(45) Date of Patent: Feb. 10, 2026

(54) AUTO TIME OPTIMIZATION FOR MIGRATION OF APPLICATIONS

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 520 days.

(21) Appl. No.: 17/994,668

(22) Filed: Nov. 28, 2022

(65) Prior Publication Data

US 2024/0176651 A1 May 30, 2024

(51) Int. Cl.
*G06F 9/46* (2006.01)
*G06F 9/48* (2006.01)

(52) U.S. Cl.
CPC ...... *G06F 9/4856* (2013.01); *G06F 2209/482* (2013.01)

(58) Field of Classification Search
CPC .............. G06F 9/4856; G06F 2209/482
See application file for complete search history.

(56) References Cited

U.S. PATENT DOCUMENTS

| | | |
|---|---|---|
| 6,105,035 A | 8/2000 | Monge |
| 6,195,760 B1 | 2/2001 | Chung et al. |
| 6,393,480 B1 | 5/2002 | Qin |
| 6,563,836 B1 | 5/2003 | Capps |
| 7,251,745 B2 | 7/2007 | Koch et al. |
| 7,401,248 B2 | 7/2008 | Nakahara et al. |

(Continued)

FOREIGN PATENT DOCUMENTS

| | | |
|---|---|---|
| CN | 106649091 A | 5/2017 |
| WO | 2021122516 A1 | 6/2021 |
| WO | 2022104396 A1 | 5/2022 |

OTHER PUBLICATIONS

Wu, Suzhen et al., Proactive Data Migration for Improved Storage Availability in Large-Scale Dat Centers, Sep. 2015, IEEE (15 pages).

(Continued)

*Primary Examiner* — Diem K Cao
(74) *Attorney, Agent, or Firm* — Chamberlain, Hrdlicka, White, Williams & Aughtry; Aly Z. Dossa

(57) ABSTRACT

Embodiments described herein relate to methods, systems, and non-transitory computer readable mediums storing instructions for creating and executing migration workflows to replicate or migrate data from one device or set of devices to another device or set of devices. In one or more embodiments, migrations involve obtaining relationship information with regards to the applications that will be migrated from one device to another device or set of devices. This relationship information is used to determine which applications and/or other system resources are affected by the migration, including those applications/system resources that are not being migrated. The migrations are performed in such a way to minimize inconvenience to the end users, by having the migration take place at a time when both the application being migrated, and related applications have reduced usage or idle time.

17 Claims, 8 Drawing Sheets

(56) References Cited

U.S. PATENT DOCUMENTS

| | | |
|---|---|---|
| 7,525,749 B2 | 4/2009 | Maejima et al. |
| 7,590,981 B2 | 9/2009 | Gupta et al. |
| 7,966,391 B2 | 6/2011 | Anderson et al. |
| 8,078,448 B1 | 12/2011 | Wohlberg et al. |
| 8,364,799 B2 | 1/2013 | Sakai |
| 8,918,673 B1 | 12/2014 | Rangaiah et al. |
| 9,015,832 B1 | 4/2015 | Lachwani et al. |
| 9,026,260 B1 | 5/2015 | Thornley et al. |
| 9,086,941 B1 | 7/2015 | Siegel |
| 9,397,930 B2 | 7/2016 | Drobinsky et al. |
| 9,417,918 B2 | 8/2016 | Chin |
| 9,514,164 B1 | 12/2016 | Matic |
| 9,515,873 B2 | 12/2016 | Anumala |
| 9,900,215 B2 | 2/2018 | Yang et al. |
| 10,303,465 B1 | 5/2019 | Potter |
| 10,572,294 B1 | 2/2020 | Chawda et al. |
| 10,785,123 B2 | 9/2020 | Gonguet |
| 11,392,402 B1 | 7/2022 | Carroll |
| 11,424,989 B2 | 8/2022 | Jeuk et al. |
| 11,588,893 B1 | 2/2023 | Sharma |
| 11,595,269 B1 | 2/2023 | Ghosh et al. |
| 11,846,918 B1 | 12/2023 | Mazur |
| 2002/0095474 A1 | 7/2002 | Boys |
| 2002/0138226 A1 | 9/2002 | Doane |
| 2003/0233230 A1 | 12/2003 | Ammicht |
| 2003/0236819 A1 | 12/2003 | Greubel |
| 2005/0216800 A1 | 9/2005 | Bicknell et al. |
| 2005/0257090 A1 | 11/2005 | Santos |
| 2006/0031842 A1 | 2/2006 | Neiman |
| 2006/0129771 A1 | 6/2006 | Dasgupta et al. |
| 2007/0079170 A1 | 4/2007 | Zimmer et al. |
| 2007/0198524 A1 | 8/2007 | Branda et al. |
| 2007/0198968 A1 | 8/2007 | Shenfield |
| 2008/0222218 A1 | 9/2008 | Richards et al. |
| 2009/0157882 A1 | 6/2009 | Kashyap |
| 2009/0265449 A1 | 10/2009 | Krishnappa et al. |
| 2009/0307522 A1 | 12/2009 | Olson et al. |
| 2011/0087672 A1 | 4/2011 | Hui |
| 2011/0113224 A1 | 5/2011 | Isshiki et al. |
| 2011/0251998 A1 | 10/2011 | Moore |
| 2011/0307903 A1 | 12/2011 | Vaddagiri |
| 2012/0054581 A1 | 3/2012 | Grube |
| 2012/0072571 A1 | 3/2012 | Orzell et al. |
| 2012/0089711 A1 | 4/2012 | Zager |
| 2012/0151061 A1 | 6/2012 | Bartfai-Walcott |
| 2012/0254849 A1 | 10/2012 | Wang |
| 2013/0103977 A1 | 4/2013 | Zimmermann |
| 2013/0346714 A1 | 12/2013 | Solihin |
| 2014/0172782 A1 | 6/2014 | Schuenzel |
| 2014/0376385 A1 | 12/2014 | Boss et al. |
| 2015/0169329 A1 | 6/2015 | Barrat |
| 2015/0222702 A1 | 8/2015 | Salle |
| 2015/0261518 A1 | 9/2015 | Viswanathan |
| 2015/0278219 A1 | 10/2015 | Phipps |
| 2015/0347573 A1 | 12/2015 | Hosokawa |
| 2016/0162280 A1 | 6/2016 | Murayama et al. |
| 2016/0239395 A1 | 8/2016 | Madsen et al. |
| 2016/0266875 A1 | 9/2016 | Takahashi |
| 2016/0359678 A1 | 12/2016 | Madani |
| 2016/0378525 A1* | 12/2016 | Bjorkengren ....... G06F 9/45558 718/1 |
| 2016/0378648 A1 | 12/2016 | Ekambaram |
| 2017/0046202 A1 | 2/2017 | Bao |
| 2017/0337088 A1 | 11/2017 | Wang |
| 2017/0359414 A1* | 12/2017 | Sengupta ............ G06F 9/45558 |
| 2018/0046489 A1* | 2/2018 | Onoue .................. G06F 9/5083 |
| 2018/0074855 A1 | 3/2018 | Kambatla |
| 2018/0113728 A1 | 4/2018 | Musani et al. |
| 2018/0124182 A1 | 5/2018 | Orman |
| 2018/0152341 A1 | 5/2018 | Maeda et al. |
| 2018/0157723 A1 | 6/2018 | Chougule |
| 2018/0196655 A1 | 7/2018 | Kapoor et al. |
| 2018/0262979 A1 | 9/2018 | Wang et al. |
| 2018/0322276 A1 | 11/2018 | Brown |
| 2019/0087224 A1 | 3/2019 | Vrind |
| 2019/0104019 A1 | 4/2019 | Makovsky |
| 2019/0199687 A1 | 6/2019 | Lan |
| 2019/0310872 A1 | 10/2019 | Griffin |
| 2019/0311041 A1 | 10/2019 | Shah |
| 2019/0379595 A1 | 12/2019 | Ur et al. |
| 2020/0028904 A1 | 1/2020 | Delbecq et al. |
| 2020/0099773 A1 | 3/2020 | Myers |
| 2020/0100323 A1 | 3/2020 | Zhou et al. |
| 2020/0104113 A1 | 4/2020 | Grill et al. |
| 2020/0110655 A1 | 4/2020 | Harwood et al. |
| 2020/0133772 A1 | 4/2020 | Dalmatov et al. |
| 2020/0156243 A1 | 5/2020 | Ghare et al. |
| 2020/0169921 A1 | 5/2020 | Zhu |
| 2020/0264919 A1 | 8/2020 | Vukovic |
| 2020/0264930 A1 | 8/2020 | Mandagere et al. |
| 2020/0344658 A1 | 10/2020 | Huang |
| 2020/0349238 A1 | 11/2020 | Tyagi |
| 2020/0366604 A1 | 11/2020 | Banerjee et al. |
| 2021/0064401 A1 | 3/2021 | Vichare |
| 2021/0084103 A1 | 3/2021 | Smith |
| 2021/0153044 A1 | 5/2021 | Ramanathan et al. |
| 2021/0165768 A1 | 6/2021 | D'halluin et al. |
| 2021/0200814 A1 | 7/2021 | Tal |
| 2021/0373947 A1 | 12/2021 | Kweon |
| 2022/0070648 A1 | 3/2022 | Krishan |
| 2022/0075613 A1 | 3/2022 | Ramachandran |
| 2022/0091980 A1 | 3/2022 | Kayiran |
| 2022/0138081 A1 | 5/2022 | Varma et al. |
| 2022/0158926 A1 | 5/2022 | Wennerstrom et al. |
| 2022/0164186 A1 | 5/2022 | Pamidala |
| 2022/0167363 A1 | 5/2022 | Sun |
| 2022/0171856 A1 | 6/2022 | Bhatt |
| 2022/0179683 A1* | 6/2022 | Verma ...................... H04L 43/08 |
| 2022/0206842 A1* | 6/2022 | Sahita ...................... G06F 21/64 |
| 2022/0229573 A1 | 7/2022 | Ramasamy |
| 2022/0240105 A1 | 7/2022 | Shaw |
| 2022/0272142 A1 | 8/2022 | Li et al. |
| 2022/0283784 A1 | 9/2022 | Degen et al. |
| 2022/0334878 A1* | 10/2022 | Chen ...................... G06F 9/4856 |
| 2022/0337493 A1 | 10/2022 | Sant et al. |
| 2022/0337501 A1 | 10/2022 | Sant et al. |
| 2022/0342697 A1 | 10/2022 | Macfarlane |
| 2022/0368602 A1 | 11/2022 | Adhav et al. |
| 2022/0413845 A1 | 12/2022 | Mathew |
| 2023/0033886 A1 | 2/2023 | Goswami et al. |
| 2023/0037124 A1 | 2/2023 | Mengwasser et al. |
| 2023/0080047 A1 | 3/2023 | Bashir |
| 2023/0098941 A1 | 3/2023 | Rizzi et al. |
| 2024/0037011 A1 | 2/2024 | Zheng |

OTHER PUBLICATIONS

Mona Elsaadawy et al., Enabling efficient application monitoring in cloud data centers using SDN, Aug. 19, 2019 (14 pages).

Steven D. Young, "In-Time Safety Assurance Systems for Emerging Autonomous Flight Operations", pp. 1-10, https://ieeexplore.ieee.org/stamp/stamp.jsp?tp=&arnumber=8569689 (Year: 2018) (10 pages).

* cited by examiner

AUTO TIME OPTIMIZATION FOR MIGRATION OF APPLICATIONS

BACKGROUND

Computing devices often exist in environments that include many devices (e.g., servers, virtualization environments, storage devices, network devices, etc.). Such environments may, from time to time, in whole or in part, require being replicated (e.g., backed-up) and/or migrated (e.g., moved from one set of devices to another). Such replications and/or migrations often require copious amounts of investigation, coordination, time, and manual steps to be performed by any number of system administrators. When a migration is performed, the application must be taken offline, this can affect other applications that are dependent on it to function or obtain data.

SUMMARY

In general, embodiments described herein relate to a method for performing a migration. The method includes identifying an application to be migrated and at least one application that is related to the application to be migrated. Once the application to be migrated and the application related to the application to be migrated are identified, both the application to be migrated and the at least one application that is related to the application to be migrated are analyzed to determine an optimized time to perform the migration. The method then proceeds to place, in a maintenance mode at the optimized time, both the application to be migrated and the at least one application that is related to the application to be migrated, and then the method performs the migration of the application to be migrated. Once the application to be migrated is migrated, both it and the at least one application that is related to it, are removed from the maintenance mode.

In general, embodiments described herein relate to a non-transitory computer readable medium comprising computer readable program code. The computer readable code, which when executed by a computer processor, enables the computer processor to perform a method for performing a migration. The method includes identifying an application to be migrated and at least one application that is related to the application to be migrated. Once the application to be migrated and the application related to the application to be migrated are identified, both the application to be migrated and the at least one application that is related to the application to be migrated are analyzed to determine an optimized time to perform the migration. The method then proceeds to place, in a maintenance mode at the optimized time, both the application to be migrated and the at least one application that is related to the application to be migrated, and then the method performs the migration of the application to be migrated. Once the application to be migrated is migrated, both it and the at least one application that is related to it, are removed from the maintenance mode.

In general, embodiments described herein relate to a system which comprises a migrator. The migrator includes at least one processor, a storage device, and a memory. The memory includes instructions, which when executed by the processor perform a method for performing a migration. The method includes identifying an application to be migrated and at least one application that is related to the application to be migrated. Once the application to be migrated and the application related to the application to be migrated are identified, both the application to be migrated and the at least one application that is related to the application to be migrated are analyzed to determine an optimized time to perform the migration. The method then proceeds to place, in a maintenance mode at the optimized time, both the application to be migrated and the at least one application that is related to the application to be migrated, and then the method performs the migration of the application to be migrated. Once the application to be migrated is migrated, both it and the at least one application that is related to it, are removed from the maintenance mode.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
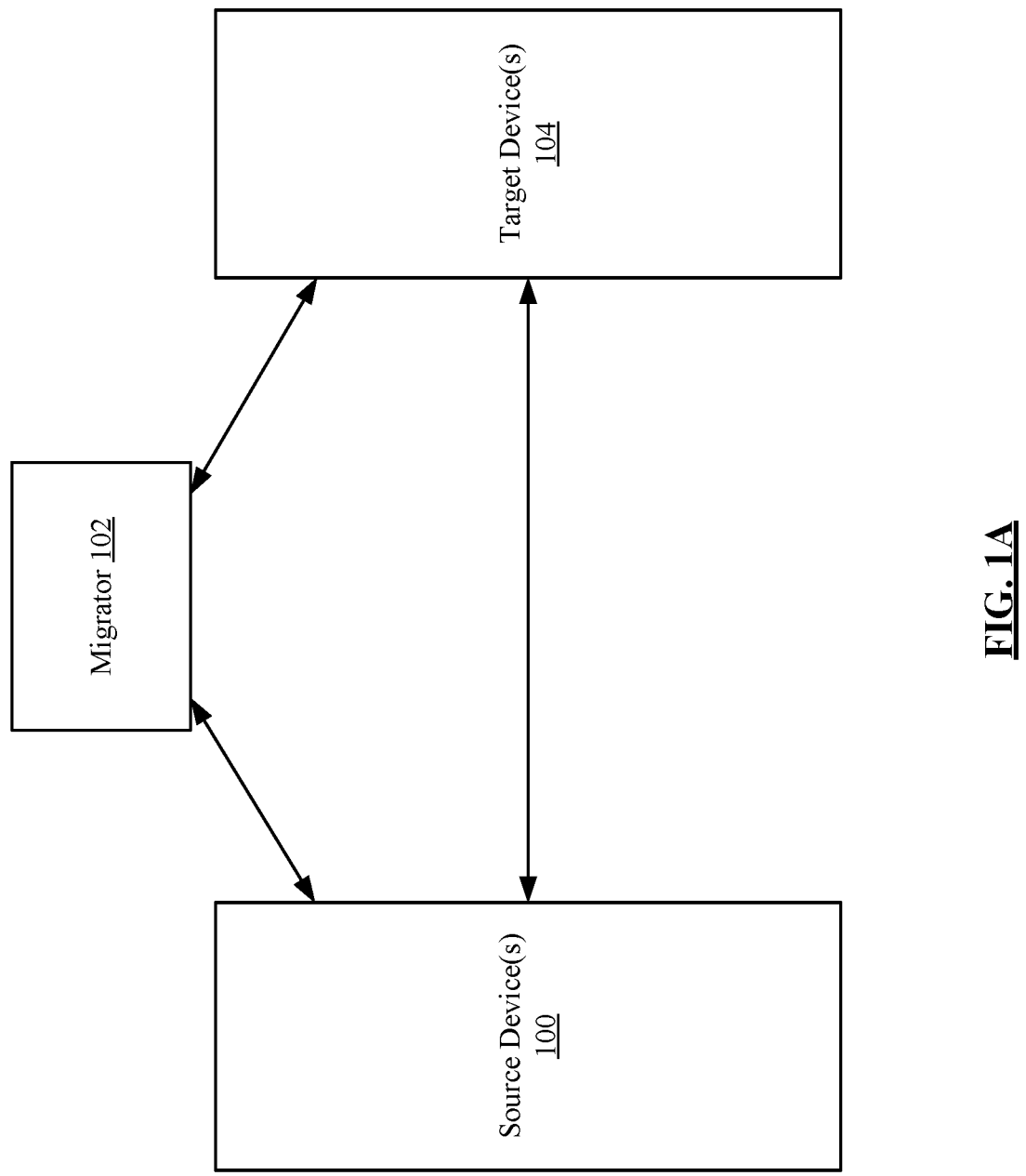
FIG. 1A shows a diagram of a system in accordance with one or more embodiments of the invention.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for creating and executing migration workflows to replicate or migrate data (collectively referred to herein as 'migration') from one device or set of devices to another device or set of devices (e.g., from one computing environment to another). In one or more embodiments, migrations involve obtaining relationship information with regards to applications that will be migrated from one device to another device or set of devices. In one or more embodiments of the invention, the migrations also consider the best time, based on use and load times, to perform a migration of each application.

In one or more embodiments, the best time for migrating the applications is determined by a dynamic strategizer. The dynamic strategizer obtains application idle times, usage (peak and decreased), as well as the amount of time it takes the application to load after being stopped. This information is collected for both the application(s) being migrated and those applications that are dependent or have other relationships with the applications being migrated. Based on this information the dynamic strategizer can determine periods of time to perform a migration when it will be least disruptive to users or related systems. These determined periods of time, along with the relationship matrix, can then be used to perform the migration.

While described as being performed on applications being migrated, one or more embodiments of the invention are not limited to applications and can be related to any aspects of an information handling system comprising of one or more servers and other computing devices being migrated, that affects the functioning of other applications and/or aspects of one or more other components of the information handling system and/or other information handling systems. One non-limiting example can be migrating a storage volume such as those storing database data.

FIG. 1A shows a diagram of a system in accordance with one or more embodiments described herein. The system may include any number of source devices (100), and any number of target devices (104). The system may also include a migrator (102) operatively connected to the source devices (100) and to the target devices (104). Each of these components is described below.

In one or more embodiments, the source devices (100) and the target devices (104) may be computing devices. Such computing devices may be referred to as endpoints. In one or more embodiments, an endpoint is any computing device, collection of computing devices, portion of one or more computing devices, or any other logical grouping of computing resources. In one or more embodiments, the source devices (100) may collectively be referred to as a source environment.

Similarly, in one or more embodiments, target devices (104) may collectively be referred to as a target environment. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements.

In one or more embodiments, any or all of the aforementioned examples may be combined to create a system of such devices, which may collectively be referred to as a computing device. Other types of computing devices may be used without departing from the scope of the invention. In one or more embodiments, a set of computing devices (100) may form all or a portion of a data domain, all, or part of which may require being migrated (e.g., re-located, backed-up, etc.) from time to time (e.g., upon request and/or pursuant to a defined schedule). In one or more embodiments, a data domain is any set of computing devices (100) for which migration services are performed, such as, for example, data backup, disaster recovery, backup data deduplication, relocation to updated/newer computing devices, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a migrator (102). In one or more embodiments, the migrator (102) is operatively connected to both the source devices (100) and the target devices (104). A migrator (102) may be located within a source environment, within a target environment, or separate from and connected to both environments. In one or more embodiments, the migrator (102) is a computing device. In one or more embodiments, a computing device (100) is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

The migrator (102) may perform one or more methods of embodiments as described herein, that are stored, for example, as software instructions. The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. The migrator (102), and components, therein are discussed further in the description of FIGS. 1B and 1C, below.

In one or more embodiments, the source devices (100), the migrator (102), and/or the target devices (104) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
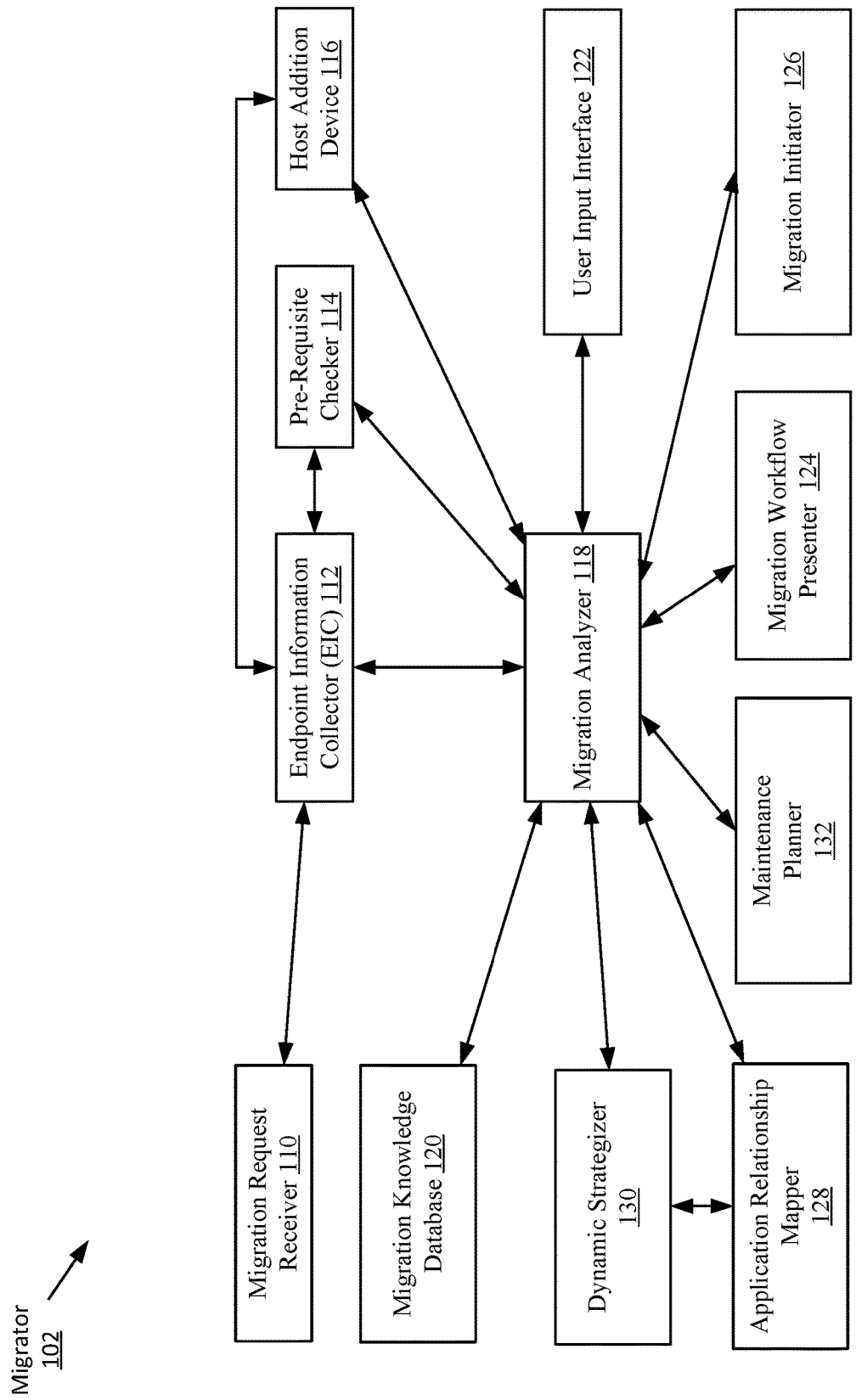
FIG. 1B shows a diagram of a migrator in accordance with one or more embodiments of the invention.

FIG. 1B shows a diagram of a migrator (102) in accordance with one or more embodiments described herein. The migrator (102) may include any number of components. As shown in FIG. 1B, the migrator (102) includes a migration request receiver (110), an endpoint information collector (EIC) (112), a pre-requisite checker (114), a host addition device (116), a migration analyzer (118), a migration knowledge database (120), a user input interface (122), a migration workflow presenter (124), a migration initiator (126), an application relationship mapper (128), a dynamic strategizer (130), and a maintenance planner (132). Each of these components is described below.

In one or more embodiments, a migrator (102) is a computing device, as discussed above in the description of FIG. 1A.

In one or more embodiments, the migrator (102) includes a migration request receiver (110). In one or more embodiments, a migration request receiver (110) is any hardware (e.g., circuitry), software, firmware, or any combination thereof that includes functionality to receive a request that all or any portion of a source environment (e.g., source devices (100) of FIG. 1A) be migrated to a target environment (e.g., target devices (104) of FIG. 1A). In one or more embodiments, such a migration request may be received via a user interface (not shown), may be received on a recurring basis as part of a planned migration scheme, may be received as part of a planned computing environment upgrade, etc. A migration request may be for any type of migration or combination of migration types. Examples of migration types include, but are not limited to: storage array to hyper-converged infrastructure (HCI); host server to host server, VM environment to HCI, storage array to storage array, hypervisors to hypervisors, host servers to storage array, on-premise computing devices to a cloud environment and vice versa, application servers to application servers (e.g., older Exchange server to either a newer on-premise Exchange server or to a cloud-based Exchange service), different source to target endpoints that may be from vendors that are unique and different, backup of all or part of a data center environment, etc. One of ordinary skill in the art, having the benefit of this detailed disclosure will appreciate that any other type of migration may be requested without departing from the scope of embodiments described herein.

In one or more embodiments, the migrator (102) includes an EIC (112) operatively connected to the migration request receiver (110). In one or more embodiments, an EIC (112) is any hardware (e.g., circuitry), software, firmware, or any combination thereof that includes functionality to obtain endpoint information from source devices and target devices. In one or more embodiments, endpoint information is obtained in any manner capable of collecting data from or about computing devices.

Such endpoint information may include, but is not limited to: system types, license information, software versions, virtualization environment details, operating system information, virtual machine information, source and target device identification information, endpoint organization information (e.g., cluster membership), HCI details information, storage configuration information, storage array details (e.g., RAID level configuration information), disk information (e.g., disk type, disk layout, etc.), network configuration information, interface connection information, network speed information, network adapter information, network addresses, feature enablement information, endpoint system setting information (e.g., BIOS information), file system information, storage management initiative specification (SMIS) object information, protocol information, device type information, cache policy information, spare storage information, storage controller information, storage area network information, operating system information, file system information, application information and settings, process identifiers, common object model (COM) object information, etc. One having ordinary skill in the art will appreciate that any other type of information that could be associated with all or any portion of computing devices or with any portion thereof in a computing environment may be considered endpoint information without departing from the scope of embodiments described herein.

In one or more embodiments, the migrator (102) includes a pre-requisite checker (114) operatively connected to the EIC (112). In one or more embodiments, a pre-requisite checker (114) is any hardware (e.g., circuitry), software, firmware, or any combination thereof that includes functionality to obtain endpoint information from the EIC (112) and use the information to perform one or more pre-requisite checks.

In one or more embodiments, a pre-requisite check is an analysis of a target environment for a migration, relative to the source environment, to identify whether any inconsistencies may exist that would cause a requested migration to fail. For example, the pre-requisite checker (114) may determine if any storage characteristics, network configuration, computing device processor settings, etc. are different in the target environment relative to the source environment. In one or more embodiments, the pre-requisite checker includes functionality to assess each difference discovered during the pre-requisite check (which may be captured in pre-requisite check logs), and to take actions to mitigate the differences discovered. Such actions may be taken, for example, by using any application programming interface, command line interface, etc. that is capable of adjusting the configuration of target devices in the target environment.

In one or more embodiments, the migrator (102) includes a host addition device (116) operatively connected to the EIC (112). In one or more embodiments, a host addition device (116) is any hardware (e.g., circuitry), software, firmware, or any combination thereof that includes functionality to obtain endpoint information from the EIC (112) in response to a request to add a new endpoint (e.g., host server) to a source environment that is being migrated as part of a migration workflow, and to generate a new migration job for the new host and add it to a migration workflow. In one or more embodiments, when a new host is added to a source environment that is being migrated by a migration workflow, the host may be added to the migration workflow instead of having to wait until the migration workflow has been completed. In one or more embodiments, when a request to add a new host is received, the host addition device (116) invokes a job priority analyzer (not shown) to determine what action to take.

In one or more embodiments, the job priority analyzer determines the priority assigned to the migration jobs of the currently executing migration workflow, which may be assigned by the job priority analyzer at that time, and/or which may have been assigned to the migration jobs prior to the new host addition. In one or more embodiments, the priority assigned to migration jobs of a migration workflow determines the order that the jobs are placed within a queue that determines the order of execution of the migration jobs.

In one or more embodiments, during execution of a migration workflow, migration jobs for specific applications or devices may be assigned a priority. As such, a migration workflow may be organized such that higher priority migration jobs occur before lower priority migration jobs. For example, a set of storage volumes that are part of a consistency group and have never been backed up may be assigned a high priority; a set of storage volumes that have been backed up a small number of times may be assigned a medium priority; and a set of storage volumes that have been backed up many times and are scheduled to be backed up on a frequent basis may be assigned a low priority.

In one or more embodiments, the job priority analyzer of the host addition device (116) determines the priority assigned to a currently executing migration job. In one or more embodiments, if the priority is higher than a priority threshold, then the new host addition request is not serviced until the current migration job is completed. For example, if the threshold is above low priority, then any medium or high priority job will be completed. In one or more embodiments, if the priority of the currently executing migration job is below the threshold, then the migration job is paused. For example, if the threshold is above a low priority, then a migration job assigned a low priority is paused.

In one or more embodiments, after completion of a migration job above a priority threshold, or after pausing a migration job below a priority threshold, the host addition device (116) services the new host addition request. In one or more embodiments, servicing the new host addition request includes using the EIC (112) to gather endpoint information about the new host, to create one or more new consistency group(s) for the new host, to create a new migration job, and to assign a priority to the new migration job. In one or more embodiments, the host addition device (116) includes functionality to place the new migration job into the queue of remaining migration jobs of a migration workflow based on the assigned priority. As such, in one or more embodiments, the new migration job is integrated into the existing and currently executing migration workflow before the migration workflow completes.

In one or more embodiments, each of the EIC (112), the pre-requisite checker (114), and the host addition device (116) of the migrator (102) are operatively connected to a migration analyzer (118). In one or more embodiments, a migration analyzer (118) is any hardware (e.g., circuitry), software, firmware, or any combination thereof that includes functionality to obtain endpoint information from the EIC (112) and to analyze the information to develop a migration workflow that includes any number of mini-workflows to perform a migration of source endpoints to target endpoints as part of a requested migration. In one or more embodiments, the migration analyzer includes functionality to classify and filter endpoint information and apply artificial intelligence via machine learning techniques (e.g., multi-label correlation algorithms) to the endpoint information to associate portions of the endpoint information with mini-workflow templates available in a migration knowledge database (discussed below) as part of building a migration workflow.

In one or more embodiments, the migration analyzer (118) is operatively connected to a migration knowledge database (120). In one or more embodiments, a migration knowledge database (120) is a data storage of any type that includes functionality to store migration workflows as sets of discrete mini-workflows that may be labeled based on the characteristics of endpoint information that may be migrated using the mini-workflow. In one or more embodiments, the migration knowledge database (120) includes a starting set of known mini-workflows for migrating a variety of standard endpoint types, as well as all, or any, portion of previously executed workflow templates, which are stored in the migration knowledge database as migration workflows are executed, thereby expanding the migration knowledge database to encompass migrations of new endpoints as they are encountered. As such, future migrations may become more efficient as the database grows to have more mini-workflow templates that encompass an increasingly large set of possible-endpoint migration scenarios.

In one or more embodiments, when a similar migration request is received, the stored workflow templates will be reused instead of creating an entirely new workflow. In one or more embodiments, the mini-workflows of the migration knowledge database (120) may be combined and/or re-combined in any way to form part of a new migration workflow, rather than only being used for the same type of overall migration workflow, for which the mini-workflow was originally used. For example, a new migration request may cause the migration analyzer to create a new migration workflow that uses certain mini-workflows from one previously executed migration workflow, and other mini-workflows from other previously executed migration workflows, to build a new migration workflow for the new request using the existing mini-workflows, instead of having to re-create each mini-workflow and/or an overall migration workflow.

In one or more embodiments, the migration analyzer (118) is also operatively connected to a user input interface (122). In one or more embodiments, a user input interface (122) is any hardware (e.g., circuitry), software, firmware, or any combination thereof that includes functionality to receive or otherwise obtain any user input required to generate a complete migration workflow. In one or more embodiments, if a migration analyzer identifies a certain mini-workflow that meets a minimum threshold as acceptable to use as part of a migration workflow to migrate a portion of the endpoint information of source endpoints, additional user input may still be required to add to the mini-workflow as additional information to facilitate the migration. In one or more embodiments, such additional information may be used to augment the selected mini-workflow, and such an augmented mini-workflow may be added as a new mini-workflow to the migration knowledge database (120) to be used in future migration workflow building, which may reduce the need for at least some future user input during the building of a migration workflow in response to a migration request. In one or more embodiments, user input may be received via the user input interface (122) via any method of receiving information. For example, a user may be presented with a graphical or command line interface that prompts a user to enter requested information.

In one or more embodiments, the migration analyzer (118) is operatively connected to a migration workflow presenter (124). In one or more embodiments, a migration workflow presenter (124) is any hardware (e.g., circuitry), software, firmware, or any combination thereof that includes functionality to present a migration workflow for approval to any one or more approving entities (not shown). In one or more embodiments, once a migration workflow has been developed for a requested migration, the entire migration workflow may be presented to any number of entities that are responsible for the migration. For example, stakeholders such as data center administrators, network administrators, system administrators, decision makers for an entity in control of a data center, etc. may each have to approve a migration workflow before a migration may take place. Accordingly, a migration workflow presenter (124) may include functionality to present the proposed migration workflow to such entities.

In one or more embodiments, the migration workflow presenter (124) is operatively connected to a migration initiator (126). In one or more embodiments, a migration initiator (126) is any hardware (e.g., circuitry), software, firmware, or any combination thereof that includes functionality to initiate a migration once the migration has been approved after presentation by a migration workflow presenter (124). In one or more embodiments, initiating a migration includes beginning execution of migration workflow jobs of a migration workflow in an order determined by a queue of migration jobs that is created based on the relative priority of the migration jobs. In one or more embodiments, a new host addition via a new host addition device (116) may pause a migration workflow to add a new migration job for a new consistency group for the new host as discussed above.

In one or more embodiments of the invention, the migrator (102) includes an application relationship mapper (128). The application relationship mapper (128) determines the relationship between individual applications that are to be migrated. Based on this determination the Migration Analyzer (118) can then determine a priority for each application.

In one or more embodiments, the job priority analyzer determines the priority assigned to the applications based on the based on the relationship matrix developed by the application relationship mapper (128). In one or more embodiments, the priority assigned to migration jobs of individual applications determines the order that the jobs are placed within a queue that determines the order of execution of the migration jobs. In one or more embodiments, a migration job requires that a parent application must be migrated and re-started successfully before a "child" application is migrated. In still other one or more embodiments of the invention, the job priority analyzer assigns applications with a HAS-A relationship a higher priority than those associated with an IS-A relationship In one or more embodiments of the invention, the application relationship mapper (128) determines the relationships between an application to be migrated and other applications. The relationship in one or more embodiments of the invention, can be determined by port mapping such as looking at port mapping meta-data or the actual system internal traffic on various ports. By analyzing whether traffic on a specific port is outgoing or incoming, the relationship mapper or other equivalent structure can determine when the application is the parent node, and which is the child node. The independent application in a system would be a parent and the dependent application would be the child. The child or dependent application would be considered to have an IS-A relationship with the parent.

In one or more embodiments of the invention, the application relationship mapper, finds multiple applications with the same system access to the same data paths and location. In this case, the application relationship mapper determines that the two applications have a HAS-A relationship. This can be determined by the application relationship mapper by looking at meta-data for the particular data path and or a registration ID that is common to at least two applications. Other means for identifying both a HAS-A relationship and/or IS-A relationship can be used, without departing from the invention.

In one or more embodiments of the invention, the migrator (102) includes a dynamic strategizer (130). The dynamic strategizer (130) analyzes data on the applications, related applications, and/or devices to determine the best strategy for migrating each application. In accordance with one or more embodiments of the invention, the dynamic strategizer obtains log data on each of the applications that are to be migrated, as well as those applications that depend on the applications to be migrated. Using the log-data, the dynamic strategizer determines the idle times and/or reduced usage times, peak usage times, and loading time of each of the applications to be migrated and those applications that depend on the application being migrated. Based on these times, the dynamic strategizer (130) in concert with the maintenance planner (132), which will be described next, is able to plan the best times to perform the migration (as will be described in more detail below with regards to the methods shown in FIGS. 2-4).

In one or more embodiments of the invention, the maintenance planner (132) places an application and any related application or system that depends on the application in a maintenance mode when performing a migration, and alerts users, administrators, and/or other concerned parties that the application will be down and for how long. In one or more embodiments of the invention, by placing application in maintenance mode, among other things, the application is taken off-line, so that users cannot continue to use or store data related to the application. This keeps the application and its data from becoming uncoordinated and/or corrupted. Once an application is migrated, the maintenance planner (132) sends a maintenance mode end signal, and the application as well as related applications, are taken out of maintenance mode and becomes available for use by the user again.

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. Accordingly, embodiments disclosed herein should not be limited to the configuration of components shown in FIG. 1B.

Figure 1C:
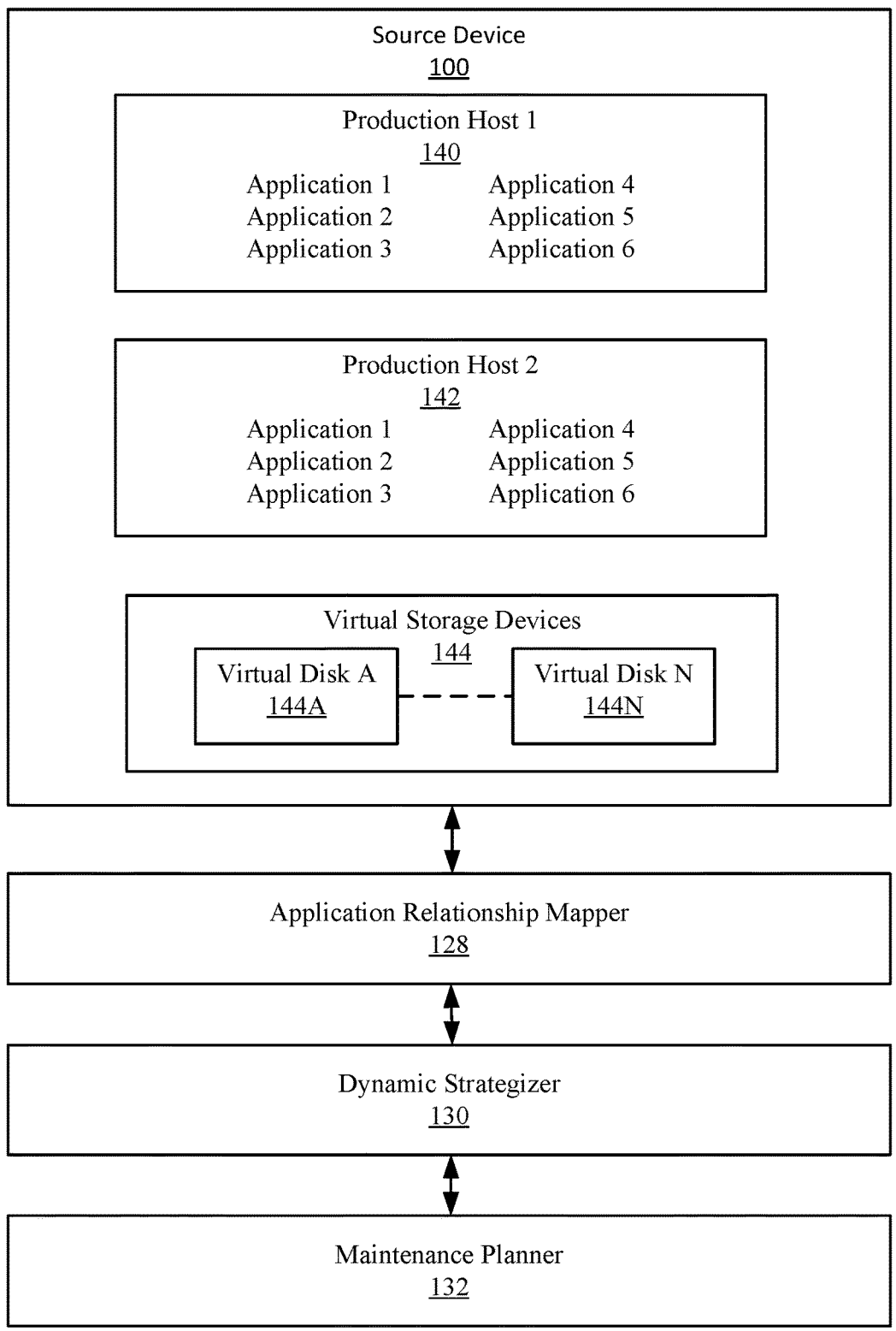
FIG. 1C shows a diagram of an information processing device in accordance with one or more embodiments of the invention.

FIG. 1C shows a diagram of a system that performs the claimed methods in one or more embodiments of the invention. The system includes source device (100) and an application relationship mapper (128) in accordance with one or more embodiments described herein. For simplicity, the system shown in FIG. 1C only shows a subset of the system (e.g., the systems shown in FIGS. 1 and 2).

As shown in FIG. 1C, the source device (100) includes a one or more hosts (e.g., 140, 142) as well as a plurality of virtual storage devices (e.g., 144A, 144N). In one or more embodiments of the invention the target device (e.g., 104, FIG. 1A) has a similar form and structure to that of the source device (100). In one or more embodiments of the invention, the target device (e.g., 104, FIG. 1A) and source device (e.g., 100) may be part of the same physical device. In other embodiments, they may be separate devices that are connected either by a wired or wireless connection. One or more of the devices may also be an Internet or cloud based virtual device. Other configurations of the source device (100) and target device (104) can be used without departing from the invention.

In one or more embodiments of the invention, the production hosts (e.g., 140, 142), host one or more applications. In one or more embodiments of the invention, the application(s) perform computer implemented services for clients (not shown). Performing the computer implemented services may include performing operations on asset data that is stored in the virtual storage devices (e.g., 144). The operations may include creating elements of assets, moving elements of assets, modifying elements of assets, deleting elements of assets, and other and/or additional operations on asset data without departing from the invention. The application(s) may include functionality for performing the aforementioned operations on the asset data in the production hosts (e.g., 140, 142). The application(s) may be, for example, instances of databases, email servers, and/or other applications. The production hosts (e.g., 140, 142) may host other types of applications without departing from the invention, including hosting the application relationship mapper (128).

In one or more of embodiments of the invention, the applications are implemented as computer instructions, e.g., computer code, stored on a persistent storage or virtual storage devices (144), that when executed by a processor(s) of the production hosts (e.g., 140, 142) cause the production hosts (e.g., 140, 142) to provide the functionality of the application(s) described throughout this application.

The production hosts (e.g., 140, 142) may include physical storage or virtual storage (144, as shown in FIG. 1C). One or more of the production hosts (e.g., 140, 142), may be externally located on a cloud or other external location. The virtual storage devices (144) may utilize any quantity of hardware storage resources of any number of computing devices for storing data. For example, the persistent storage may utilize portions of any combination of hard disk drives, solid state disk drives, tape drives, and/or any other physical storage medium of any number of computing devices.

In one or more embodiments of the invention, the production hosts (e.g., 140, 142) may host virtual machines that host the above-discussed applications. Each of the production hosts (e.g., 140, 142) may host any number of VMs that, in turn, host any number of applications. Each of the production hosts (e.g., 140, 142) may host or be operatively connected to a plurality of virtual storage devices (e.g., 144A, 144N). Alternatively, in one or more embodiments of the invention the virtual storage devices (144) can instead be physical storage devices such as hard disk drive, solid disk drive, tape drives, and or other physical storage mediums of any number of computing devices.

Figure 6:
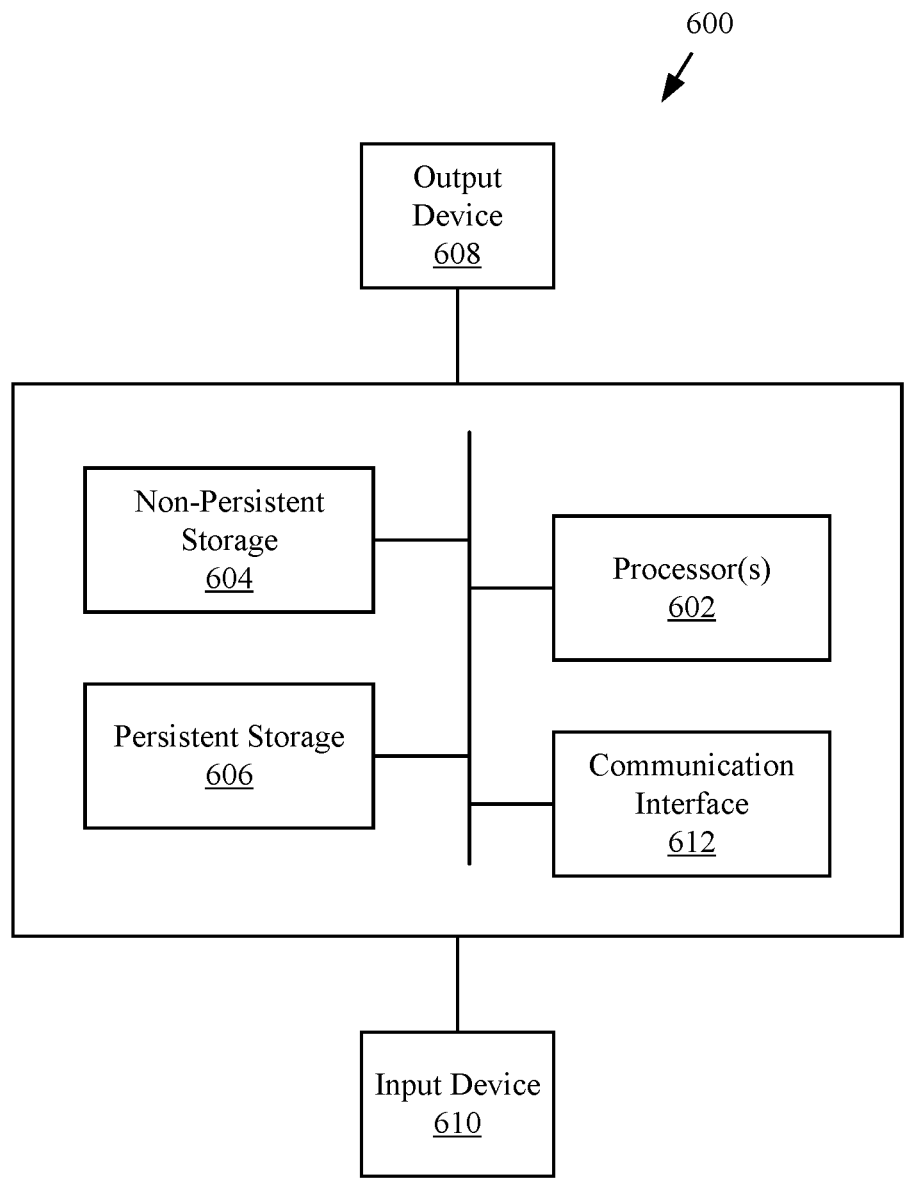
FIG. 6 shows a computing system in accordance with one or more embodiments of the invention.

In one or more embodiments of the invention, the production hosts (e.g., 140, 142) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the production hosts (e.g., 140, 142) described throughout this application.

In one or more embodiments of the invention the system as shown in FIG. 1C includes an application relationship mapper (128) for determining the relationship of the various applications on one or more hosts (e.g., 140, 142) that are to be migrated in accordance with the method of the invention which will be described in more detail with regards to FIGS. 2-4.

The application relationship mapper (128) can include multiple components such as an inter-process communication (IPC) engine and an application correlation mapper (not shown). Other engines and modules can be included in the application relationship mapper (128) in accordance with one or more embodiments of the invention. The application relationship mapper (128) can be a separate device from the hosts (e.g., 140, 142) or can be part of a common information handling system that includes both the source device (100) and application relationship mapper (128).

The application relationship mapper (128) monitors and controls communications between various devices making up the source (100) and/or target device (104). The communications can take the form of, but not limited to, shared memory segments, pipes, message queues, semaphore arrays, and sockets. The application relationship mapper (128) also correlates the dependencies between applications and stores these dependencies in a data store (not shown). The application relationship mapper (128) can determine the relationship of each application that is to be migrated as discussed above with regards to FIGS. 1A and 1B, and in more detail below with regards to the methods of FIGS. 2-4.

In one or more embodiments of the invention, the application relationship mapper (128) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the application relationship mapper (128) described throughout this application.

In one or more embodiments of the invention, the system as shown in FIG. 1C includes the dynamic strategizer (130), and maintenance planner (132). As discussed above with regards to FIGS. 1A and 1B, and in more detail with regards to the methods of FIGS. 2 and 3, the dynamic strategizer (130) and maintenance planner (132) analyze each application's use and load times to determine, in concert with the application relationship mapper (128), when the best time to migrate an application and its dependencies. In one or more embodiments of the invention the maintenance planner (132) also alerts a user, administrator, or other concerned entity that the application will be unavailable for a set period of time that includes the time to migrate and load the application.

In one or more embodiments of the invention, the dynamic strategizer (130) and maintenance planner (132) may be implemented as computing devices (e.g., 600, FIG. 6). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the application relationship mapper (128), described throughout this application.

While FIG. 1C shows a configuration of components, other configurations may be used without departing from the scope of embodiments described herein. For example, although FIG. 1C shows all components as part of two devices, any of the components may be grouped in sets of one or more components which may exist and execute as part of any number of separate and operatively connected devices. Accordingly, embodiments disclosed herein should not be limited to the configuration of components shown in FIG. 1C.

Figure 2:
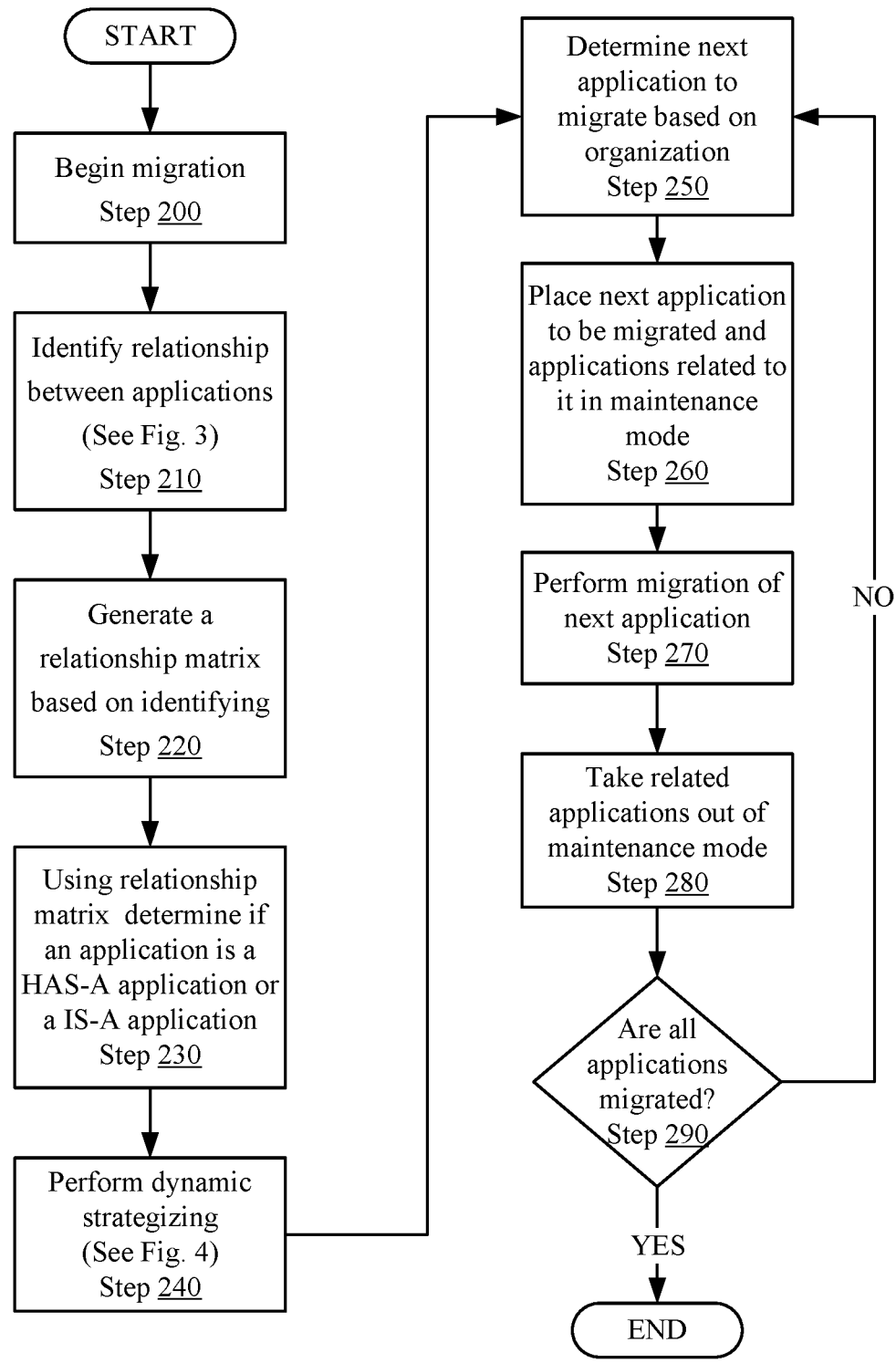
FIG. 2 shows a flowchart of a method for migrating applications in accordance with one or more embodiments of the invention.

FIG. 2 shows a flowchart describing a method for migrating one or more applications from a first device to a second device in accordance with one or more embodiments disclosed herein. The method may be performed by, for example, the migrator (e.g., 102, FIG. 1A) and/or any other part of either the source device (e.g., 100, FIG. 1A) or target device (e.g., 104, FIG. 1A). Other components of the system illustrated in FIGS. 1A-1C may perform all, or a portion of the method of FIG. 2 without departing from the invention.

While FIG. 2 is illustrated as a series of steps, any of the steps may be omitted, performed in a different order, additional steps may be included, and/or any or all the steps may be performed in a parallel and/or partially overlapping manner without departing from the invention.

In step 200, a request is received to migrate any amount of a source device's applications and information to a target device or devices. In one or more embodiments, the migration request is received by a migrator (e.g., 102, FIG. 1A).

In step 210, the migrator (e.g., 102, FIG. 1A) identifies the relationship between the applications, as will be discussed in more detail below, with regards to the method of FIG. 3. The migrator can determine which applications are dependent on each application to be migrated in-order to function. In one or more embodiments of the invention, the migrator can also determine the relationship each application has with each other application that is being migrated such as determining if two migrating applications have a HAS-A or IS-A relationship.

As discussed above, this is done by having the application relationship mapper (e.g., 128, FIG. 1B) analyze inter-process communications. The inter-process communication may include any one of shared memory segments, pipes, message queues, semaphore arrays and sockets. Other inter-process communications can be monitored as well. From this analysis and/or other processes, the specific port(s) that an application is running on are identified. The application relationship mapper (128, FIG. 1B) can also identify shared pipes. In one or more embodiments of the invention, the relationship mapper can also utilize system logs to determine which applications communicate with each other as well as when they are most active or least active.

Based on the inter-process communications, ports, and shared pipes, as well as system logs, the application relationship mapper can identify applications that are related to each other. Using the information gathered on the various communications, ports and pipes, the application relationship mapper (128, FIG. 1B) can determine their relationship and identify if the relationship is an IS-A or HAS-A type relationship, as well as determined which applications are affected or dependent on an application or system that is being migrated.

In step 210, the migrator uses this identification of the relationships between the at least two applications to produce a matrix for each application showing its relationship to other applications. The matrix can take the form of a table as shown in the exemplary table below:

TABLE 1

Relationship Matrix

| Application | Relationship | Applications |
|---|---|---|
| DA1 | HAS-A | DA2, DA3, DA4 |
| DA2 | HAS-A | DA1 |
| DA3 | HAS-A | DA1 |
| DA4 | HAS-A; IS-A | DA1, DA5; DA1, DA6 |
| DA5 | HAS-A | DA4 |
| DA6 | Independent node | |
| DA7 | HAS-A; IS-A | DA8; DA4 |
| DA8 | HAS-A; IS-A | DA7; DA4 |
| DA9 | IS-A | DA5 |
| DA10 | IS-A | DA5 |
| DA11 | IS-A | DA9 |
| DA12 | IS-A | DA7; DA4 |
| DA13 | IS-A | DA6 |
| DA14 | HAS-A; IS-A | DA15; DA13 |
| DA15 | HAS-A | DA14 |

In Table 1, the relationships between fifteen different applications (DA1-DA15) are shown. The target application is listed in the first column. The type of relationship the target application has with other applications is listed in the second column (HAS-A: where two applications are working together, IS-A: where the child application is dependent on the parent application, and Independent: the application is independent of the other applications). The applications that the target application has the relationship listed in the second column with, is listed in the third column. More than one application can have the same type of relationship with the first application. The matrix produced in step 220 can take other forms such as database and in one or more embodiments of the invention, it can also be represented in the form of a relationship tree, which is discussed below with regards to the example in FIG. 5.

In step 230, using the matrix or table generated in step 220, the method determines whether an application is a HAS-A application or IS-A application.

In step 240, the information determined in steps 210-230 is then used for performing dynamic strategizing, as will be discussed in more detail below with regards to the method shown in FIG. 4. The information includes the prioritization and use time determined by the dynamic strategizing in step 210 to organize the applications and determine an optimized time and order to migrate the applications. This is done in order to perform the migration in such a way that will result in the least disruption of the applications being migrated as well as those applications that are dependent on them.

In step 250, the next (or first) application to be migrated is determined based on the determination made in step 240. This application, in step 260, is placed in a maintenance mode by the maintenance planner (e.g., 132, FIG. 1C). In one or more embodiments of the invention, all of the applications that are dependent on the application to be migrated are also placed in the maintenance mode. This prevents a user from using the applications or an application dependent on it, while it is not available, which could result in the failure of the application or data not being stored correctly or at all.

In one or more embodiments, the applications that are dependent on the application can include either/or a plurality of applications that are being migrated as well as a plurality of applications that are not being migrated. In step 260 both those applications that are being migrated and are dependent on the application currently being migrated and those applications that are not being migrated but are dependent, either directly or indirectly (through another application or process) are placed in the maintenance mode. By determining and placing even those applications that are not being migrated and are indirectly dependent on the application being migrated in the maintenance mode, the method minimizes unexpected failures to applications due to the migration.

In accordance with one or more embodiments of the invention, based on the idle time or period of time of least usage, as determined in step 240 and discussed in more detail below with regards to the method shown in FIG. 4, the maintenance planner can estimate how long the migration and subsequent restoration of the applications will take. Based on this estimate, the maintenance planner can notify users and/or administrators of the estimated amount of time that the applications will not be available, so that the user and/or administrator can make appropriate decisions on when to resume using the application as well as potentially altering the timing for the migration to a more convenient period of time. The timing of step 260 is based on the optimized (or best time) determined as determined in step 240 (see e.g., FIG. 4).

Continuing with the discussion of FIG. 2, once the application is put in a maintenance mode in step 260, the application is migrated in step 270 and once the migration is completed, the method proceeds to step 280.

In step 280, the application is loaded, and the maintenance planner then sends a maintenance end signal or similar signal, taking the application, as well as those that depend on it, out of the maintenance mode. In one or more embodiments of the invention, the application is left in maintenance mode, until all of the applications to be migrated that are its dependencies are also migrated and successfully loaded. The applications (both those being migrated and those that depend on the applications being migrated) can, in one or more embodiments of the invention, be left in a maintenance mode, until after a post migration check is performed. An optional notification signal can be sent to users, administrators, and other concerned parties that the application is available for use once more. Alternatively, in one or more embodiments of the invention, all applications can be kept in maintenance mode until all applications successfully migrated and are loaded.

The method then proceeds to step 290. If all the applications have been migrated, then the method may end after step 290. However, if applications still remain, the method then returns to step 250, and the next application is migrated.

Figure 3:
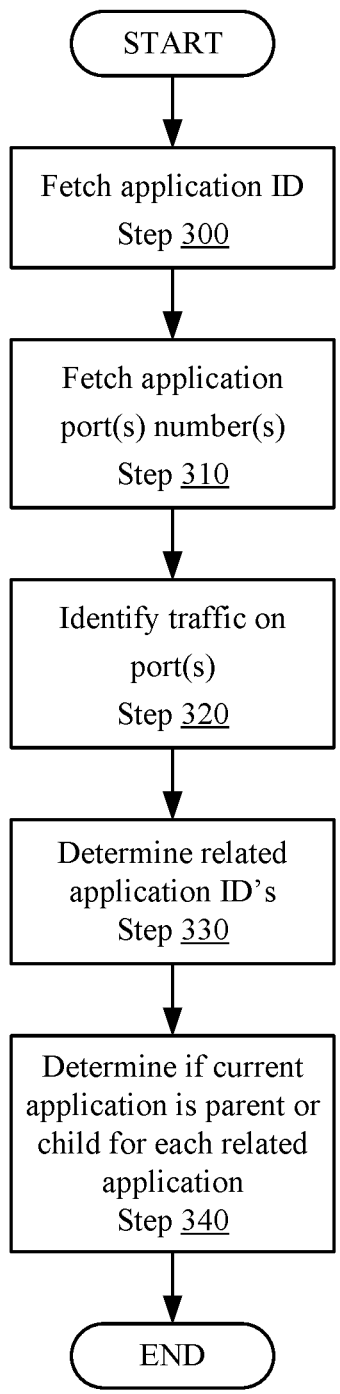
FIG. 3 shows a flowchart of a method to determine parent and child relationships for an application being migrated in accordance with one or more embodiments of the invention.

FIG. 3 shows a flowchart describing a method for determining the relationship between at least two applications in accordance with one or more embodiments disclosed herein. This method may be performed on its own or as part of step 210 of the method of FIG. 2. The method may be performed by, for example, the application relationship mapper (e.g., 128, FIG. 1C) and/or any other part of either the source device (e.g., 100, FIG. 1) or target device (e.g., 104, FIG. 1). Other components of the system illustrated in FIGS. 1A-1C may perform all, or a portion of the method of FIG. 3 without departing from the invention.

While FIG. 3 is illustrated as a series of steps, any of the steps may be omitted, performed in a different order, additional steps may be included, and/or any or all the steps may be performed in a parallel and/or partially overlapping manner without departing from the invention.

In step 300, for each application that is to be migrated, the method fetches the application identification (ID). This may be an ID given to an application by the migrator, a developer, or alternatively an ID that the system uses to identify the specific application.

Once the ID is obtained, then the method in step 310 obtains the port number(s) used by the application. Step 310 can be performed by the application relationship mapper (e.g., 128, FIG. 1C), as described in more detail above. Other components of the migrator or the production hosts, alternatively, can perform step 310 without departing from the invention. The method then identifies all the applications using a particular port(s) in step 320 and determines which applications are related in step 430.

Based on the determination made in step 330, and specifics of the communications between two applications, the migrator in step 340 determines if a current application is a parent or child for each related application. That information can then be used in step 220 of the method of FIG. 2.

Once step 340 is complete, the method may end.

Figure 4:
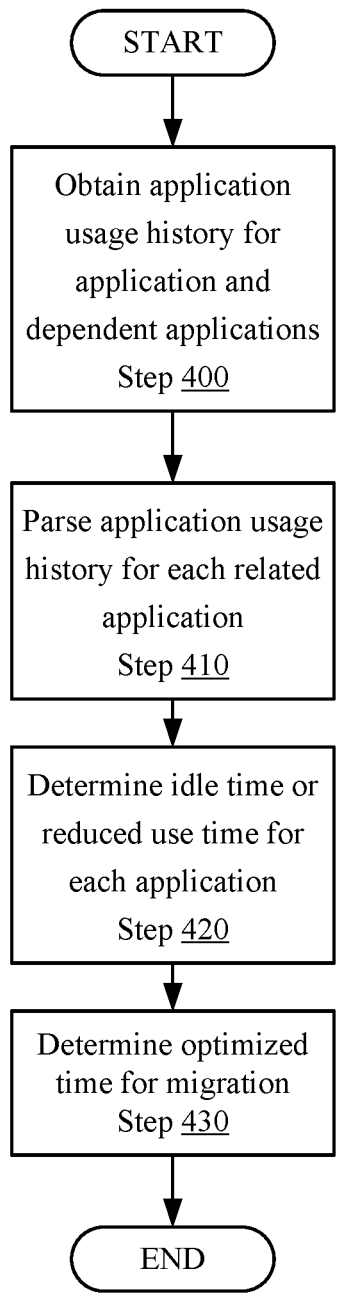
FIG. 4 shows a flowchart of a method for performing dynamic strategizing.

FIG. 4 shows a flowchart describing a method for performing dynamic strategizing in accordance with one or more embodiments disclosed herein. This method may be performed on its own or as part of step 240 of the method of FIG. 2. The method may be performed by, for example, the dynamic strategizer (e.g., 130, FIG. 1C) and/or any other part of either the source device (e.g., 100, FIG. 1) or target device (e.g., 104, FIG. 1). Other components of the system illustrated in FIGS. 1A-1C may perform all, or a portion of the method of FIG. 4 without departing from the invention.

While FIG. 4 is illustrated as a series of steps, any of the steps may be omitted, performed in a different order, additional steps may be included, and/or any or all the steps may be performed in a parallel and/or partially overlapping manner without departing from the invention.

In step 400, the application being migrated along with applications that are dependent on it have their usage history obtained. In one or more embodiments of the invention, the method can include obtaining usage history from system logs for the application, however other sources can be used including user/administrator input, configuration files, and other logs, files, and/or sources. The usage history can include such things as idle times, decrease usage, peak usage, as well as load times.

In one or more embodiments of the invention current usage can also be obtained from logs or by performing a function to obtain current system tasks. For example, a "tasklist" command can be used, and from the resulting data CPU time for each application can be obtained to determine the amount of resource usage the application is currently using. Any other information useful for determining a preferred time(s) to migrate the application can also be obtained.

Once the usage history is obtained and any other related information, the usage history is parsed in step 410. And idle times and/or reduced use times are determined in step 420.

The method then proceeds to step 430, where an optimized or best time for the migration is determined using the idle time and/or reduced usage time for each application. Ideally, the optimized time is a time when there is sufficient overlap between when the application to be migrated and the applications dependent on it have a reduced usage time and/or idle time. This time would then be used as the optimized time for performing the migration, because the migration would have the least impact on all of the applications.

However, if such an ideal time for the optimize time cannot be determined, the method works to find a best solution. This solution can be obtained by using preconfigured priorities for the applications, as set by a user, administrator, and/or a manufacturer. Alternatively, a best time can be determined by using optimization algorithms that determine when overall the least impact on a user or other related applications occurs. In the event that the best time (as opposed to the optimized time) is used, then the best time becomes the optimized time for purposes of the remainder of steps 250-280 in FIG. 2.

Once step 430 is complete the method of FIG. 4 may end.

EXAMPLE

Figure 5:
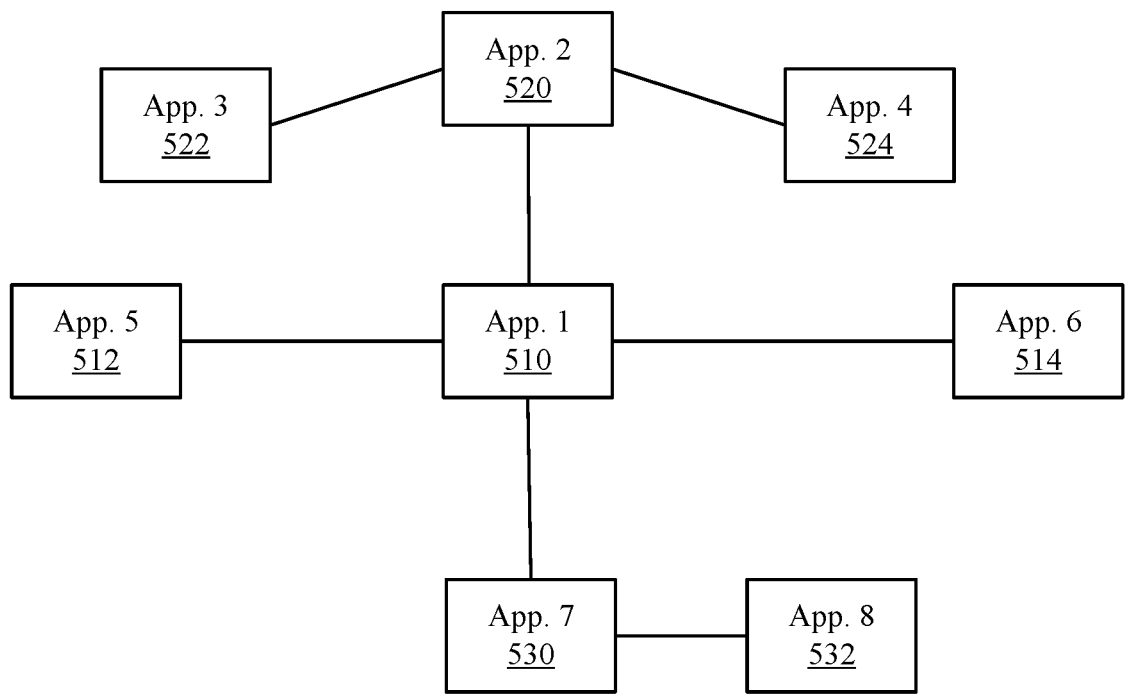
FIG. 5 shows an example of a relationship tree in accordance with one or more embodiments of the invention.

FIG. 5 shows an example of a relationship tree (500) in order to better describe the relationships between multiple applications and which application in accordance with one or more embodiments of the invention would need to be placed in a maintenance mode when one or more applications are migrated. While the example is shown as a simplified relationship tree for easier understanding, other methods of organizing the applications can be used such as a table, and/or relationship matrix. The tree includes eight applications (510-532), which are either parent or child applications related to each other. More or less applications can be mapped in this manner and the number of applications is only dependent on the number of applications that the migration described in the method of FIGS. 2-4 is specified to be performed as specified by either a user, administrator, or other components of the migrator (e.g., 102, FIG. 1B).

In the example shown in FIG. 5, assume that application 1 (e.g., 510), is located on a common host with applications 5 and 6 (e.g., 512 and 514), while applications 2-4 (e.g., 520-524), application 7 (e.g., 530), and application 8 (e.g., 532) are located on other hosts and/or other locations such as a cloud server. Application 1 (e.g., 510) is dependent (i.e., a child application) on applications 7 (e.g., 530) and 8 (e.g., 532) while applications 2-6 (e.g., 512, 514, 520-524) depend on application 1 (e.g., 510) either directly or indirectly. In at least some configurations, applications 3, 4, and 8 (e.g., 522, 524, and 532) would not be aware of application 1 (e.g., 510).

When performing the migration, as described in more detail with regards to the methods shown in FIGS. 2-4, the application relationship mapper (e.g., 128, FIG. 1C) determines the above relationships. The dynamic strategizer (e.g., 130, FIG. 1C) then determines an optimized time to migrate applications 1 (e.g., 510) and 6 (e.g., 514) as well as the priority between these two applications.

As discussed above with regards to the methods shown in FIGS. 2-4, the optimized time is determined based on current and historical use times as well as idle times for both the application being migrated and those that are dependent on it. The migrator (e.g., 102, FIG. 1A) then migrates the applications, in accordance with one or more embodiments of the invention.). If applications 1 and 6 (e.g., 510 and 514) are to be migrated first, then the maintenance planner, in accordance with one or more embodiments of the invention will place applications 1-6 (e.g., 510-524) in a maintenance mode at a time that is optimized for all six applications. Applications 7 and 8 (e.g., 530 and 532), however, will continue to function as normal.

Other orders of migrating as well as methods of determining an optimized time to perform the migration can be considered in accordance with one or more embodiments of the invention based on criteria specified by a user or administrator as well as other components of the migrator (e.g., 102 of FIG. 1B) in addition to the order specified in the methods of FIGS. 2-4. FIG. 5 is intended as an example only.

End Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many diverse types of computing devices exist, and the aforementioned input and output device(s) may take other forms.

In general, embodiments described above relate to methods, systems, and non-transitory computer readable mediums storing instructions for creating and executing migration workflows to replicate or migrate data from one device or set of devices to another device or set of devices (e.g., from one computing environment to another). In one or more embodiments, migrations involve obtaining relationship information with regards to the applications that will be migrated from one device to another device or set of devices. This relationship information is used to determine which applications and/or other system resources are affected by the migration, including those applications/system resources that are not being migrated. The migrations are performed in such a way to minimize inconvenience to the end users, by having the migration take place at a time when the application has reduced usage or idle time.

This approach attempts to prevent an application or other service from failing during the migration, due to a dependent application being off-line for migration. By performing the above-described methods, systems, and instructions, breaking of dependency between applications during migration can be minimized and migration failure due to device failure can be minimized. The method, systems, and instruction described above, attempt to assure that the migration will be successful with minimal interruption to the user.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing a migration, the method comprising:
   receiving a request to migrate an application;
   identifying a relationship between the application and at least one application that is related to the application wherein identifying the relationship comprises analyzing shared memory segments, message queues, semaphore arrays, and sockets associated with the application and the at least one application;
   generating a relationship matrix using the relationship;
   performing, using the relationship matrix, dynamic strategizing to determine a priority of the application;
   analyzing the application, the at least one application, and the priority of the application to determine an optimized time to perform the migration;
   placing in a maintenance mode, at the optimized time, the application and the at least one application;
   performing, after placing in the maintenance mode, the migration of the application; and
   removing from the maintenance mode, after performing the migration, the application and the at least one application.

2. The method of claim 1, wherein the application is one of a plurality of applications that are to be migrated.

3. The method of claim 2, wherein the at least one application is not included in the plurality of applications that are to be migrated.

4. The method of claim 1, wherein the at least one application comprises a plurality of applications related to the application.

5. The method of claim 4, wherein determining the optimized time to perform the migration comprises determining when the application to be migrated and each of the plurality of applications to be migrated have either an idle time or a period when the application's use is lower.

6. The method of claim 4, wherein determining the optimized time to perform the migration comprises using data from system logs related to the application and the plurality of applications.

7. A non-transitory computer readable medium comprising computer readable program code, which when executed by a computer processor enables the computer processor to perform a method for performing a migration, the method comprising:
   receiving a request to migrate an application;
   identifying a relationship between the application and at least one application that is related to the application wherein identifying the relationship comprises analyzing shared memory segments, message queues, semaphore arrays, and sockets associated with the application and the at least one application;

generating a relationship matrix using the relationship;

performing, using the relationship matrix, dynamic strategizing to determine a priority of the application;

analyzing the application, the at least one application, and the priority of the application to determine an optimized time to perform the migration;

placing in a maintenance mode, at the optimized time, the application and the at least one application;

performing, after placing in the maintenance mode, the migration of the application; and removing from the maintenance mode, after performing the migration, the application and the at least one application.

8. The non-transitory computer readable medium of claim 7, wherein the application is one of a plurality of applications that are to be migrated.

9. The non-transitory computer readable medium of claim 8, wherein the at least one application is not included in the plurality of applications that are to be migrated.

10. The non-transitory computer readable medium of claim 7, wherein the at least one application comprises a plurality of applications related to the application.

11. The non-transitory computer readable medium of claim 10, wherein determining the optimized time to perform the migration comprises determining when the application to be migrated and each of the plurality of applications to be migrated have either an idle time or a period when the application's use is lower.

12. The non-transitory computer readable medium of claim 10, wherein determining the optimized time to perform the migration comprises using data from system logs related to the application and the plurality of applications.

13. A system comprising:
a migrator which comprises:
at least one processor;
a storage device; and
at least one memory that includes instructions, which when executed by the processor, perform a method for performing a migration, the method comprising:
receiving a request to migrate an application;
identifying a relationship between the application and at least one application that is related to the application
wherein identifying the relationship comprises analyzing shared memory segments, message queues, semaphore arrays, and sockets associated with the application and the at least one application;
generating a relationship matrix using the relationship;
performing, using the relationship matrix, dynamic strategizing to determine a priority of the application;
analyzing the application, the at least one application, and the priority of the application to determine an optimized time to perform the migration;
placing in a maintenance mode, at the optimized time, the application and the at least one application;
performing, after placing in the maintenance mode, the migration of the application; and
removing from the maintenance mode, after performing the migration, the application and the at least one application.

14. The system of claim 13, wherein the application is one of a plurality of applications that are to be migrated.

15. The system of claim 14, wherein the at least one application is not included in the plurality of applications that are to be migrated.

16. The system of claim 13, wherein the at least one application comprises a plurality of applications related to the application.

17. The system of claim 16, wherein determining the optimized time to perform the migration comprises determining when the application to be migrated and each of the plurality of applications to be migrated have either an idle time or a period when the application's use is lower.

* * * * *